(12) United States Patent
Yamaguchi et al.

(10) Patent No.: US 9,154,701 B2
(45) Date of Patent: Oct. 6, 2015

(54) IMAGE CAPTURING DEVICE AND ASSOCIATED METHODOLOGY FOR DISPLAYING A SYNTHESIZED ASSISTANT IMAGE

(75) Inventors: Hiroaki Yamaguchi, Tokyo (JP); Fumikazu Hatanaka, Nara (JP)

(73) Assignee: SONY CORPORATION, Tokyo (JP)

(*) Notice: Subject to any disclaimer, the term of this patent is extended or adjusted under 35 U.S.C. 154(b) by 251 days.

(21) Appl. No.: 13/176,953

(22) Filed: Jul. 6, 2011

(65) Prior Publication Data

US 2012/0044402 A1 Feb. 23, 2012

(30) Foreign Application Priority Data

Aug. 23, 2010 (JP) ................. 2010-186294

(51) Int. Cl.
| | | |
|---|---|---|
| *H04N 5/225* | (2006.01) | |
| *H04N 5/262* | (2006.01) | |
| *H04N 5/232* | (2006.01) | |
| *G03B 13/02* | (2006.01) | |
| *G03B 17/20* | (2006.01) | |

(52) U.S. Cl.
CPC ............ *H04N 5/23293* (2013.01); *G03B 13/02* (2013.01); *G03B 17/20* (2013.01); *H04N 5/23212* (2013.01)

(58) Field of Classification Search
CPC ..................................................... G03B 37/04
USPC .......................... 348/36, 333.11, 239, 208.14
See application file for complete search history.

(56) References Cited

U.S. PATENT DOCUMENTS

| | | | |
|---|---|---|---|
| 7,656,429 B2* | 2/2010 | Larson ...................... 348/208.14 |
| 2004/0189856 A1* | 9/2004 | Tanaka ........................... 348/345 |
| 2006/0181619 A1* | 8/2006 | Liow et al. .................... 348/239 |
| 2006/0204054 A1* | 9/2006 | Steinberg et al. ............. 382/118 |
| 2009/0142001 A1* | 6/2009 | Kuniyuki ...................... 382/284 |
| 2010/0111429 A1* | 5/2010 | Wang et al. ................... 382/233 |
| 2012/0026190 A1* | 2/2012 | He et al. ........................ 345/633 |

FOREIGN PATENT DOCUMENTS

| | | | |
|---|---|---|---|
| JP | 2002-72333 | A | 3/2002 |
| JP | 2003-259163 | A | 9/2003 |
| JP | 2006084735 | * | 9/2004 |
| JP | 2007-36983 | | 2/2007 |
| JP | 2007-279767 | | 10/2007 |
| JP | 2009-33507 | | 2/2009 |
| JP | 2009-218915 | A | 9/2009 |

* cited by examiner

*Primary Examiner* — Joel Fosselman
(74) *Attorney, Agent, or Firm* — Oblon, McClelland, Maier & Neustadt, L.L.P.

(57) ABSTRACT

An image capturing device includes an assistant image synthesizing unit that changes a degree of transparency of a first assistant image in a transparent background area set in a second assistance image, when generating a synthesized assistant image by synthesizing the first and second assistant images providing assistance information for capturing, and a display control unit that overlaps the synthesized assistant image with a captured image and displays the image on a display unit.

14 Claims, 11 Drawing Sheets

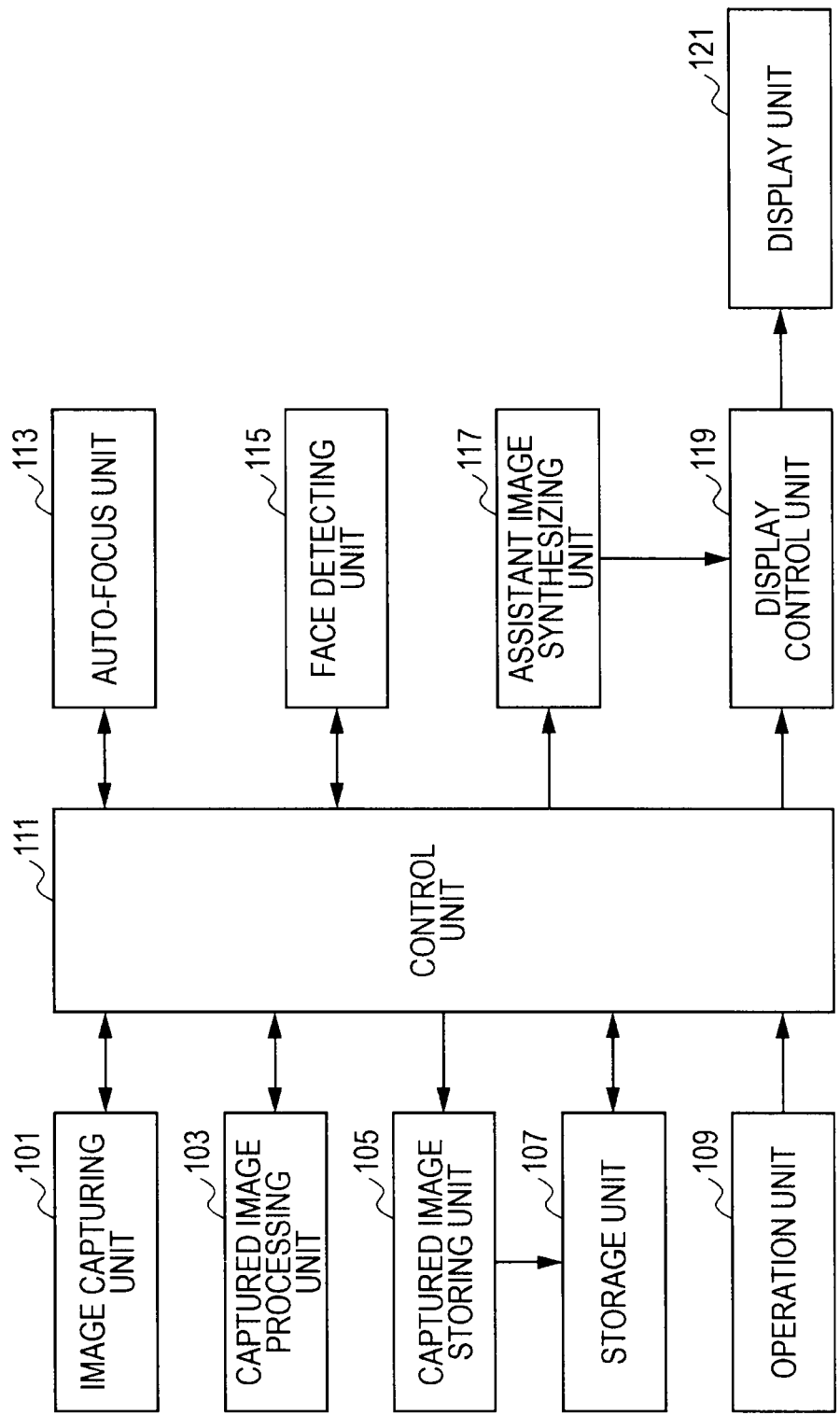

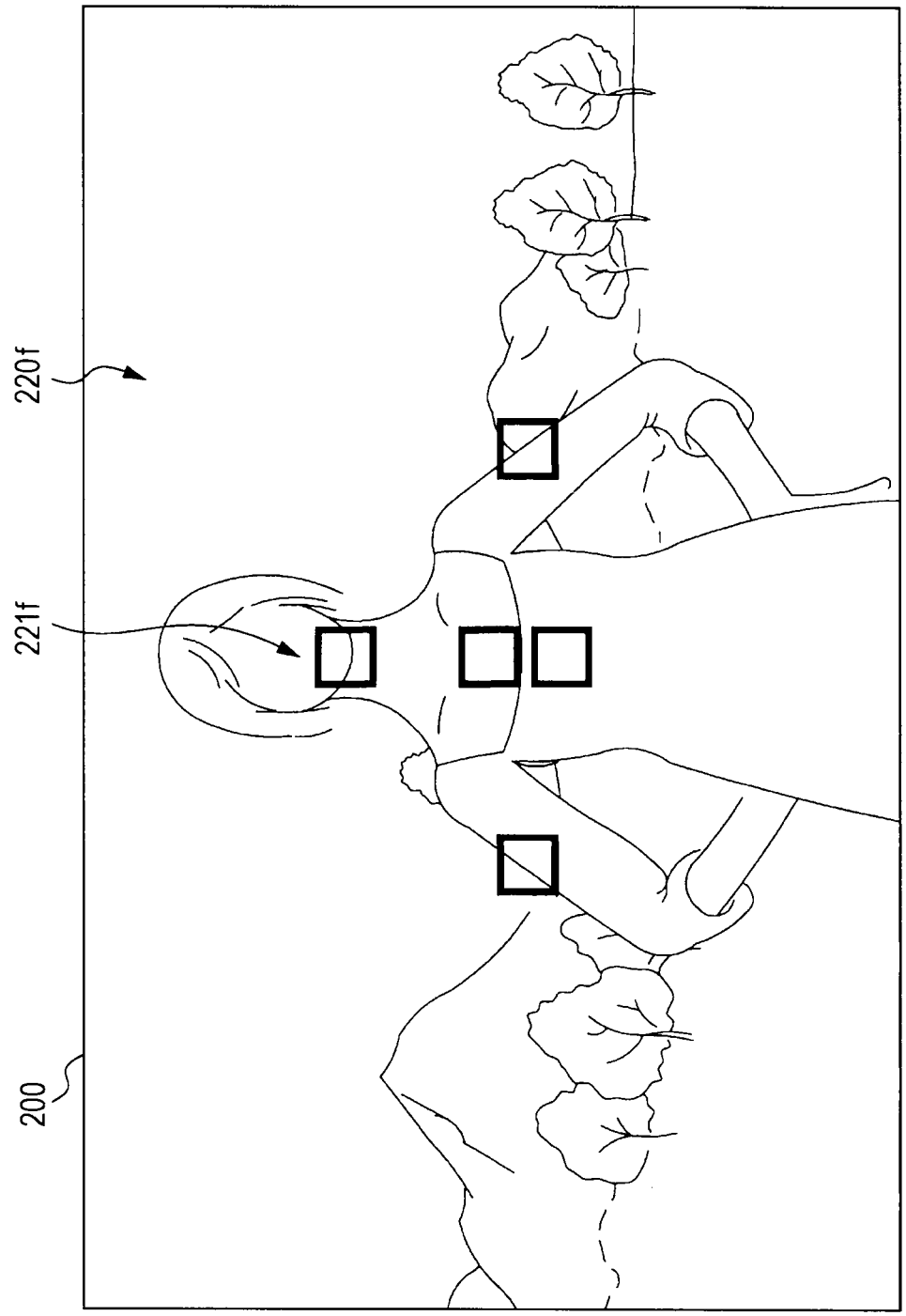

IMAGE CAPTURING DEVICE AND ASSOCIATED METHODOLOGY FOR DISPLAYING A SYNTHESIZED ASSISTANT IMAGE

BACKGROUND

The present disclosure relates to an image capturing device, a program, and an image capturing method.

Generally, an image capturing device such as a digital camera is provided with a display unit such as back panel using, for example, an LCD (Liquid Crystal Display) or the like, and an electronic finder. In the display unit, it is possible to display a captured image output by an image capturing element in a live view, and to overlap and display assistance information for capturing, such as a photographing mode and a zoom magnification with the captured image.

Using such a display unit, for example, a technique of providing a user with information assisting determination of an image capturing composition by a user has been developed. For example, in Japanese Unexamined Patent Application Publication No. 2007-279767, a technique of overlapping and displaying an assistant line such as a grid pattern with a captured image in an electronic finder is described. In Japanese Unexamined Patent Application Publication No. 2009-33507, a technique of overlapping and displaying a figure image such as a graticule arbitrarily drawn by a user in the same manner is described. In Japanese Unexamined Patent Application Publication No. 2007-36983, a technique of synthesizing and displaying a scale mark, a graticule, or the like according to each lens with a captured image in a lens-exchangeable digital camera is described.

SUMMARY

When a plurality of kinds of assistance information is overlapped and displayed with the captured image by the techniques described above, the plurality of information is overlapped, and, on the contrary, there is a problem that the determination of the image capturing composition by the user is inhibited. For example, when grid lines described in Japanese Unexamined Patent Application Publication No. 2007-279767 and an auto-focus frame representing an area which is a target of focusing by auto-focus are overlapped and displayed with the captured image, the grid lines are displayed in the auto-focus frame, and it may be difficult to recognize a part of the captured image in the auto-focus frame.

It is desirable to provide a new or improved image capturing device, program, and image capturing method, capable of suppressing interference of a plurality of assistance information overlapped and displayed with a captured image.

According to an embodiment of the present disclosure, there is provided an image capturing device including: an assistant image synthesizing unit that changes a degree of transparency of a display area of a first assistant image in a transparent background area set in a second assistance image, when generating a synthesized assistant image by synthesizing the first and second assistant images providing assistance information for capturing; and a display control unit that overlaps the synthesized assistant image with a captured image and displays the image on a display unit.

The assistant image synthesizing unit may change the degree of transparency at least on the basis of synthesis mode information added to the second assistant image.

The assistant image synthesizing unit may make the display area of the first assistant image completely transparent in the background area.

The background area may be an area including a display area of the second assistant image.

The first assistant image may be a referential line image of the captured image, and the second assistant image may be an area line image of the captured image.

The referential line image may be a grid line image, and the area line image may be an auto-focus frame image.

The auto-focus frame image may include a plurality of auto-focus frames.

The referential line image may be a grid line image, and the area line image may be a face detection range image.

The image capturing device may further include a control unit that sets the changed degree of transparency according to a user's operation acquired by an operation unit.

The image capturing device may further include a control unit that automatically sets the changed degree of transparency according to a state of an image capturing process.

According to another embodiment of the present disclosure, there is provided a program for causing a computer to execute: changing a degree of transparency of a display area of a first assistant image in a transparent background area set in a second assistance image, when generating a synthesized assistant image by synthesizing the first and second assistant images providing assistance information for capturing; and overlapping the synthesized assistant image with a captured image and displaying the image on a display unit.

According to still another embodiment of the present disclosure, there is provided an image capturing method including: changing a degree of transparency of a display area of a first assistant image in a transparent background area set in a second assistance image, when generating a synthesized assistant image by synthesizing the first and second assistant images providing assistance information for capturing; and overlapping the synthesized assistant image with a captured image and displaying the image on a display unit.

According to the embodiments of the present disclosure as described above, it is possible to suppress interference of a plurality of assistance information overlapped and displayed with a captured image.

BRIEF DESCRIPTION OF THE DRAWINGS

FIG. 1 is a block diagram illustrating a functional configuration of an image capturing device according to a first embodiment of the present disclosure.

FIG. 11 is a diagram illustrating an example of an area line image according to the embodiment.

DETAILED DESCRIPTION OF EMBODIMENTS

Figure 2A:
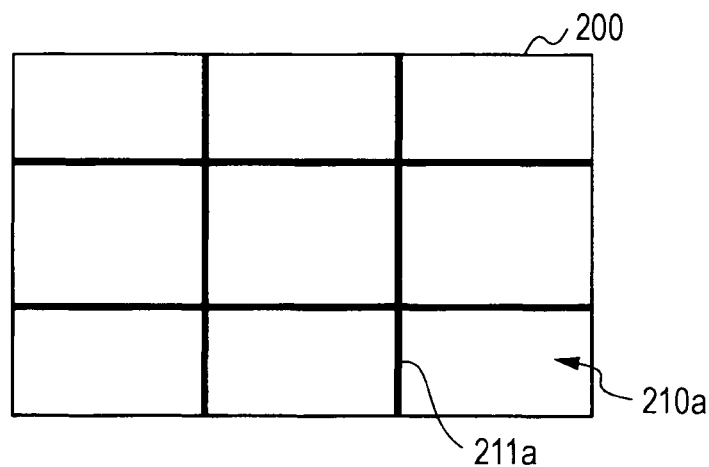
FIG. 2A to FIG. 2c are diagrams illustrating examples of referential line images according to the embodiment.

Hereinafter, preferred embodiments of the present disclosure will be described in detail with reference to the accompanying drawings. In the specification and the drawings, the same reference numerals and signs are given to constituent elements having substantially the same function configuration, to avoid the repeated description.

The description will be performed in the following order.
1. First Embodiment
1-1. Function Configuration of Image Capturing Device
1-2. Configuration of Assistant Image
1-3. Synthesis of Assistant Image
2. Second Embodiment
3. Third Embodiment
4. Overview
1. First Embodiment
1-1. Function Configuration of Image Capturing Device First, a functional configuration of an image capturing device according to a first embodiment of the present disclosure will be described with reference to FIG. 1. FIG. 1 is a block diagram illustrating the functional configuration of the image capturing device 100 according to the first embodiment of the present disclosure.

The image capturing device 100 captures an image of a photography subject, and records a still image or a moving image obtained by the capturing as digital image data in a recording medium. The image capturing device 100 is realized as, for example, a digital camera, and may be further realized as an arbitrary electronic apparatus having the image capturing function described above.

Referring to FIG. 1, the image capturing device 100 includes an image capturing unit 101, a captured image processing unit 103, a captured image recording unit 105, a storage unit 107, an operation unit 109, a control unit 111, an auto-focus unit 113, a face detecting unit 115, an assistant image synthesizing unit 117, a display control unit 119, and a display unit 121.

The image capturing unit 101 captures an image of the photography subject and outputs the captured image. The image capturing unit 101 includes, for example, an image capturing optical system, an image capturing element, a timing generator, an optical component driving unit, and the like. The image capturing optical system is formed of optical components such as various lenses such as a focus lens and a zoom lens, an optical filter removing an unnecessary wavelength, and a diaphragm. The optical image (photography subject image) incident from the photography subject is formed on an exposure face of the image capturing element through optical components of the image capturing optical system. The image capturing element (image sensor) is formed of a solid image capturing element such as a CCD (Charge Coupled Device) and a CMOS (Complementary Metal Oxide Semiconductor). The image capturing element performs photoelectric conversion of the optical image led from the image capturing optical system, and outputs an image signal (analog image signal) representing the captured image to the captured image processing unit 103.

The captured image processing unit 103 performs a predetermined process on the image signal representing the captured image output from the image capturing unit 101, and outputs the processed image signal. The captured image processing unit 103 may be realized using, for example, a DSP (Digital Signal Processor). The captured image processing unit 103 includes, for example, an analog signal processing unit, an analog-digital conversion unit, a digital signal processing unit, and the like. The analog signal processing unit is a so-called analog front end which preprocesses the image signal. For example, the analog signal processing unit performs a CDS (Correlated Double Sampling) process, a gain process based on a PGA (Programmable Gain Amplifier), and the like, on the image signal output from the image capturing unit 101. The analog-digital conversion unit converts the analog image signal input from the analog signal processing unit into a digital image signal, and outputs the digital signal to the digital signal processing unit. The digital signal processing unit performs a digital signal process such as noise removal, white balance adjustment, color correction, edge emphasis, and gamma correction, on the input digital image signal, and outputs the image signal after the digital signal process to the captured image recording unit 105 and the display control unit 119. The captured image processing unit 103 may not necessarily perform the analog and digital signal processes. For example, the image capturing unit 101 may output the digital image signal, and the captured image processing unit 103 may perform only the digital signal process.

The captured image recording unit 105 compresses the image signal after the signal process output from the captured image processing unit 103 in a predetermined compression encoding format such as JPEG (Joint Photographic Experts Group), and stores the compressed data as image data in the storage unit 107. The captured image recording unit 105 may further store metadata representing additional information about the image data in the storage unit 107. The captured image recording unit 105 may be realized using, for example, a DSP in the same manner as the captured image processing unit 103.

Data about the process of the image capturing device 100 is stored in the storage unit 107. The storage unit 107 may be, for example, a semiconductor memory such as a flash ROM (Read Only Memory) and a DRAM (Dynamic Random Access Memory), an optical disc such as a BD (Blu-ray Disc), a DVD (Digital Versatile Disc), and a CD (Compact Disc), or a hard disk. The storage unit 107 may be a storage device built in the image capturing device 100, and may be a removable medium attachable to and detachable from the image capturing device 100, such as a memory card. The storage unit 107 may include various storage devices or removable media. In the storage unit 107, programs used by the control unit 111 and data of assistant images to be described later may be stored, as well as the image data is stored by the captured image recording unit 105.

The operation unit 109 serving as a user interface for operating the image capturing device 100 has, for example, various operation buttons such as a shutter button, a cross button, or a menu button provided outside the image capturing device 100, a touch panel, or a remote controller, and outputs the operation signal according to a user's operation to the control unit 111. The operation unit 109 outputs operation signals according to a user's operation such as operating and stopping of the image capturing device 100, photographing of a still image, starting and ending photographing a moving image, or setting of various functions of the image capturing device 100, to the control unit 111.

The control unit 111 controls operations of units of the image capturing device 100. For example, the control unit 111 may be realized using an operation processing device such as a microcontroller provided in the DSP. The control unit 111 operates on the basis of the program stored in, for example, the flash ROM included in the storage unit 107 to perform various operation processes necessary for control.

The DRAM included in the storage unit 107 may be used in the operation process. The program described above may be stored in a disc recording medium or a removable storage medium such as a memory card and may be provided for the image capturing device 100. The program may be downloaded in the image capturing device 100 through a network such as a LAN (Local Area Network) and the internet.

The auto-focus unit 113 moves the focus lens of the image capturing optical system included in the image capturing unit 101 through the control unit 111, and automatically focuses the image capturing optical system on a specific photography subject. The auto-focus unit 113 may be realized using, for example, a DSP in the same manner as the captured image processing unit 103. The auto-focus unit 113 may output information about an auto-focus frame or an auto-focus area to be described later. The auto-focus unit 113 may operate, for example, in a phase difference detecting manner. In this case, first, the auto-focus unit 113 detects a phase difference in the auto-focus frame preset in the captured image, using a photoelectric sensor such as a line sensor (not shown). Next, the auto-focus unit 113 calculates a focus position to focus the image capturing optical system on the specific photography subject in the auto-focus frame on the basis of the phase difference. In addition, the auto-focus unit 113 controls the optical component driving unit of the image capturing unit 101 through the control unit 111 to move the focus lens, and focuses the image capturing optical system on the specific photography subject. The auto-focus unit 113 may perform the focusing process by the user's operation through the operation unit 109, or with respect to one or a plurality of automatically extracted auto-focus frames, in the plurality of preset auto-focus frames. The auto-focus unit 113 may operate in a contrast detecting manner. In this case, first, the auto-focus unit 113 controls the optical component driving unit of the image capturing unit 101 through the control unit 111 to move the focus lens. Next, the auto-focus unit 113 detects contrast in the specific auto-focus area including the photography subject of the captured image, and specifies a position where the contrast is the maximum as the focus position. The auto-focus area may be an arbitrary area in the captured image, and may be, for example, a face area detected by the face detecting unit 115 to be described later.

The face detecting unit 115 detects one or a plurality of faces included in the captured image. The face detecting unit 115 may be realized using, for example, a DSP in the same manner as the captured image processing unit 103. The face detecting unit 115 calculates the face area using an algorithm such as wavelet conversion and Haar characteristic detection, from the captured image. The face area may be coordinate values of a minimum rectangle including a jaw, ears, and eyebrows. The face area may not necessarily be rectangular, and may be a form such as a triangle or an oval. The face detecting unit 115 may be set to detect all faces included in the captured image, and may be set to detect a number of faces limited by order of size or the like of the face area. The face detecting unit 115 may output the calculated information of the face area.

The assistant image synthesizing unit 117 synthesizes a plurality of assistant images for overlapping and displaying with the captured image to generate a synthesized assistant image, and outputs the synthesized assistant image to the display control unit 119. The assistant image synthesizing unit 117 may be realized using, for example, a DSP in the same manner as the captured image processing unit 103. The assistant image is an image providing assistance information for image capturing. Specifically, the assistant image may be an image representing an auto-focus frame which is a target of focusing by the auto-focus unit 113, an image of the face area detected by the face detecting unit 115, an image of grid lines which assist determination of an image capturing composition by a user, an image representing set values of a photographing mode, a zoom magnification, and the like, or an image of operation buttons when the image capturing device 100 is provided with a touch panel. The assistant image may be based on the image data stored in advance in the storage unit 107, and may be generated by the output of the auto-focus unit 113 or the face detecting unit 115. For example, the assistant image synthesizing unit 117 synthesizes each of a plurality of assistant images as a layer to generate one synthesized assistant image. In this case, the assistant image synthesizing unit 117 can change a degree of transparency of a specific part of the assistant image. The assistant image synthesizing unit 117 may refer to synthesis mode information added to the assistant image to be described later to change the degree of transparency.

A process of the assistant image synthesizing unit 117 will be described later. The display control unit 119 performs a display control to the display unit 121 to display various kinds of data. The display control unit 119 may be realized using, for example, a DSP in the same manner as the captured image processing unit 103. For example, the display control unit 119 outputs image data in which the synthesized assistant image output from the assistant image synthesizing unit 117 is overlapped with a captured image (through-image) which is being captured and input in real time from the captured image processing unit 103, to the display unit 121. The display unit 121 is formed of, for example, an LCD or an organic EL (Electro-Luminescence) display, and displays the image data input from the display control unit 119. In this case, an image in which assistance information for image capturing is overlapped and displayed with the captured image which is being captured, is displayed on the display unit 121. Accordingly, the user can operate the image capturing device 100 while viewing the image which is being captured and the assistance information about the image which is being captured.

The image data output from the display control unit 119 to the display unit 121 is periodically updated. The assistant image synthesizing unit 117 may periodically synthesize the assistant image according to the update of the image data to generate the synthesized assistant image, and may output the synthesized assistant image to the display control unit 119. When the assistant images to be synthesized are updated, the assistant image synthesizing unit 117 may synthesize the assistant image to generate the synthesized assistant image, and may output the synthesized assistant image to the display control unit 119. In this case, the synthesized assistant image may be stored in the storage unit 107, and may be repeatedly used by the display control unit 119 until the next synthesized assistant image is output by the assistant image synthesizing unit 117.

1-2. Configuration of Assistant Image

Figure 2B:
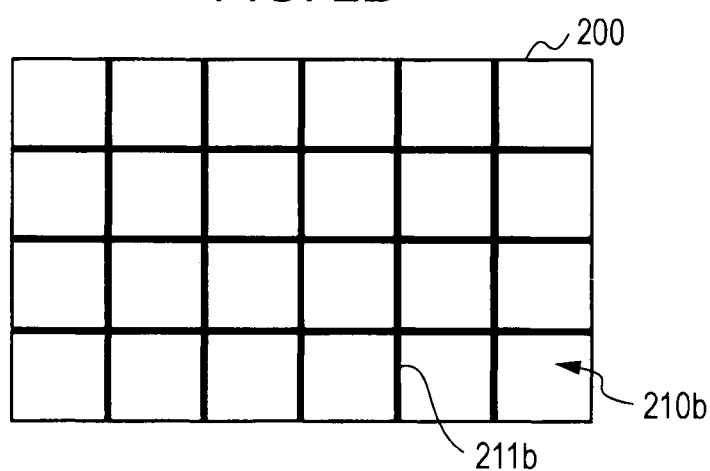
Figure 2C:
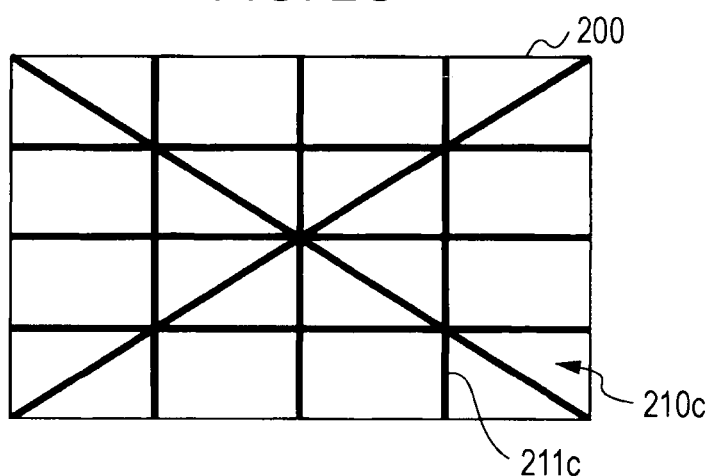
Figure 3A:
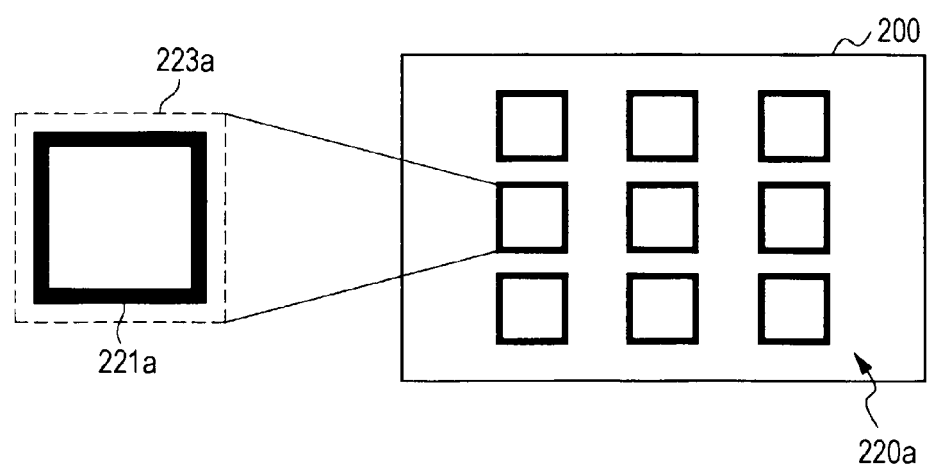
FIG. 3A and FIG. 3B are diagrams illustrating examples of area line images according to the embodiment.
Figure 3B:
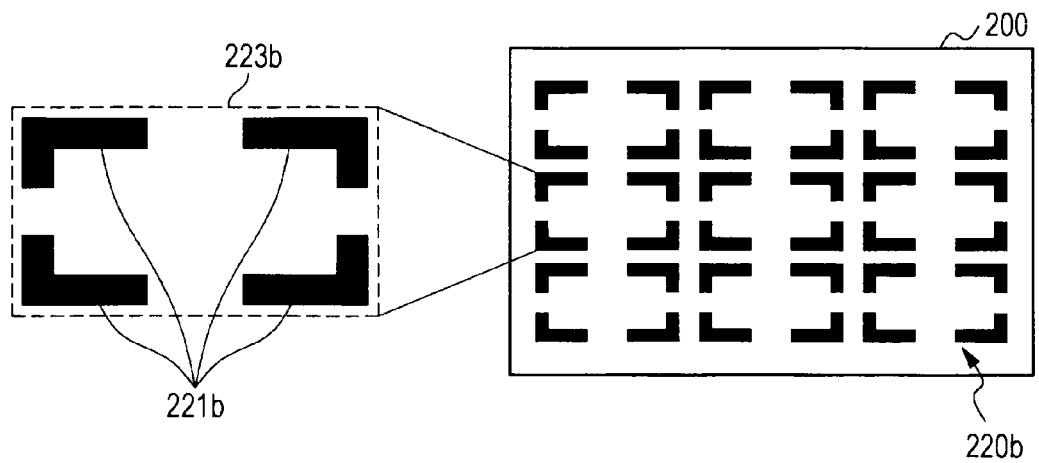

Next, a configuration of the assistant image according to the first embodiment of the present disclosure will be described with reference to FIG. 2A to FIG. 3B. FIG. 2A to FIG. 2C are diagrams illustrating examples of a referential line image 210 that is a first assistant image according to the first embodiment of the present disclosure. FIG. 3A and FIG. 3B are diagrams illustrating examples of an area line image 220 that is a second assistant image according to the first embodiment of the present disclosure. Herein, two assistant images of the referential line image 210 and the area line image 220 are described as an example. However, for example, other assistant images such as an image representing set values of a photographing mode, a zoom magnification, and the like, and an image of operation buttons when the image capturing device 100 is provided with a touch panel, may be used instead of the two assistant images or with the two assistant images.

(1) Referential Line Image

FIG. 2A to FIG. 2C show three examples of the referential line image 210 that is the first assistant image. The referential line image 210 is displayed as a reference or target, for example, when a user determines a composition. Specifically, the referential line image may be horizontal lines, vertical lines, grid lines in which the horizontal lines and the vertical lines are combined, or a center mark representing the center of the screen 200. The referential line image 210 may be stored in advance as image data in the storage unit 107 of the image capturing device 100. In each referential line image 210, a part other than the display area 211 is a transparent area. When the referential line image 210 is overlapped with the other image such as the captured image, the overlapped image is transparently displayed in the transparent area.

In the referential line image 210*a* shown in FIG. 2A, the display area 211*a* is grid lines dividing the screen 200 into three vertical parts and three horizontal parts. In the referential line image 210*b* shown in FIG. 2B, the display area 211*b* is grid lines dividing the screen 200 into four vertical parts and six horizontal parts and more delicate than those shown in FIG. 2A. In the referential line image 210*c* shown in FIG. 2C, the display area 211*c* is grid lines dividing the screen 200 into four vertical parts and four horizontal parts and is diagonal lines of the screen 200.

In addition to the three examples, there may be the referential line image 210 with various patterns according to user's usage or preference. The image capturing device 100 may be preset to display any of the referential line images 210, and the displayed referential line image 210 may be selectable according to a user's operation. In the image capturing device 100, the referential line image 210 recognizing and automatically displaying the contents of the captured image may be selected.

(2) Area Line Image

FIG. 3A and FIG. 3B show two examples of the area line image 220 that is the second assistant image. The area line image 220 may be, for example, the auto-focus frame used in the process of the auto-focus unit 113 in the image capturing device 100, or the area of the face detected by the face detecting unit 115. The area line image 220 may be, for example, stored in advance as image data in the storage unit 107 of the image capturing device 100 in the same manner as the auto-focus frame when the auto-focus unit 113 operates in the phase difference detecting manner. The area line image 220 may be, for example, the auto-focus frame when the auto-focus unit 113 operate in the contrast detecting manner, or the image generated by each unit of the image capturing device 100 and stored in the storage unit 107 in the same manner as the face area detected by the face detecting unit 115. In each area line image 220, a part other than the display area 221 is a transparent area. When the area line image 220 is overlapped with the other image such as the referential line image 210 or the captured image, the overlapped image is transparently displayed in the transparent area.

A background area 223 is further set in the area line image 220. The background area 223 is an area including the display area 221. Specifically, as shown, the background area 223 may be an area representing the inside of the area surrounded by the display area 221 in the area line area 220. The background area 223 may further include an area in the vicinity of the display area 221. When the area line image 220 is overlapped with the other assistant image such as the referential line image 210, the degree of transparency of the other assistant image such as the overlapped referential line image 210 may be changed in the background area 223. The process of changing the degree of transparency will be described later.

The area line image 220*a* shown in FIG. 3A is an image in a plurality of auto-focus frames which are set on the screen 200, when the auto-focus unit 113 operates in the phase difference detecting manner. Although nine auto-focus frames are shown in FIG. 3A, the number of auto-focus frames is not limited thereto, and one or an arbitrary plurality of auto-focus frame may be displayed. FIG. 3A shows an enlarged view of one of the plurality of auto-focus frames.

The display area 221*a* is a substantially rectangular area, and the substantial rectangle represents the auto-focus frame. The background area 223*a* is an area including an inner area of the substantial rectangle and the vicinity thereof.

The area line image 220*b* shown in FIG. 3B is an image in a plurality of auto-focus areas which can be set on the screen 200, when the auto-focus unit 113 operates in the contrast detecting manner. Although nine auto-focus areas are shown in FIG. 3B, the number of auto-focus areas is not limited thereto, and one or an arbitrary plurality of auto-focus areas may be displayed. FIG. 3B shows an enlarged view of one of the plurality of auto-focus areas. The display area 221*b* is an area having a shape combined such that four hook-shaped figures displayed as the auto-focus area forms a substantial rectangle, and the substantial rectangle represents the auto-focus area. The background area 223*b* is an area including the inside of the substantial rectangle and the vicinity thereof.

1-3. Synthesis of Assistant Image

Figure 4:
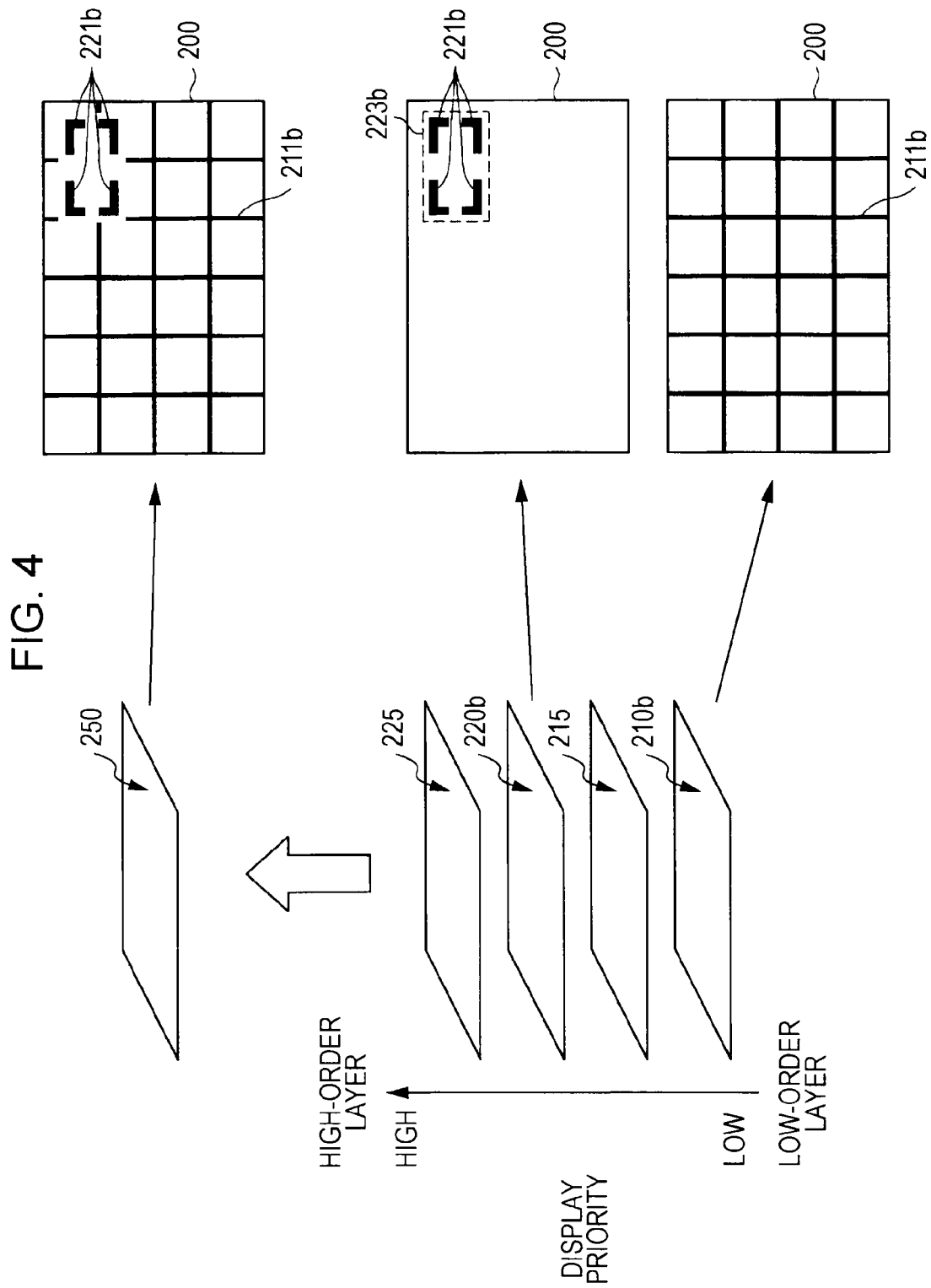
FIG. 4 is a diagram illustrating an example of a synthesis process of an assistant image according to the embodiment.

Next, synthesis of the assistant images according to the first embodiment of the present disclosure will be described with reference to FIG. 4 to FIG. 6. FIG. 4 is a diagram illustrating an example of a synthesis process of the assistant images according to the embodiment. FIG. 5A to FIG. 5C are diagrams illustrating examples of an image displayed in the embodiment. FIG. 6 is a flowchart illustrating the synthesis process of the assistant images according to the embodiment.

(1) Schematic Description of Process

FIG. 4 schematically shows an example of the synthesis process of the assistant images in the image capturing device 100 according to the embodiment. The assistant image synthesizing unit 117 synthesizes a plurality of assistant images including the referential line image 210*b* that is the first assistant image and the area line image 220*b* that is the second assistant image to generate the synthesized assistant image 250. The assistant images to be synthesized may further include the other assistant images 215 and 225. The other assistant images 215 and 225 may be, for example, the image representing the set values of the photographing mode, the zoom magnification, and the like, or the image of the operation buttons when the image capturing device 100 is provided with a touch panel, as described above.

In the shown example, the composition of the assistant images to be synthesized is an example. Accordingly, for example, the referential line image 210*b* may be the other kind of referential line image such as the referential line images 210*a* and 210*c* described with reference to FIG. 2A and FIG. 2C. The area line image 220*b* may be the other kind of area line image such as the area line image 220*a* described with reference to FIG. 3A. The first assistant image may not necessarily be the referential line image 210, and the second assistant image may not necessarily be the area line image 220. The plurality of assistant images synthesized by the assistant image synthesizing unit 117 may include at least the first assistant image and the second assistant image, there may not be the other assistant images 215 and 225, and there may be more assistant images.

Display priority is set in the plurality of assistant images synthesized by the assistant image synthesizing unit 117. In the shown examples, the display priority is set in the order of the referential line image 210b that is the first assistant image, the other assistant images 215, the area line image 220b that is the second assistant image, and the other assistant image 225, from the low priority side. The assistant image synthesizing unit 117 considers each of assistant image data as a layer structure in which the assistant image with lower display priority is a low-order layer and the assistant image with higher display priority is a high-order layer, and synthesizes the assistant images by overlapping the assistant images in order from the low-order layer, to generate the synthesized assistant image 250.

The display priority set in the shown example is an example. Accordingly, for example, the referential line image 210b that is the first assistant image may not be necessarily the lowest-order layer, and the other assistant image 215 may be set as a lower-order layer. There may be no layer in the higher order than the area line image 220b, and the area line image 220b may be the highest-order layer. The display priority of the second assistant image may be set higher than that of the first assistant image, and the display priority of the other assistant images 215 and 225 may be set arbitrarily.

In the shown example, first, the assistant image synthesizing unit 117 synthesizes the referential line image 210b that is the first assistant image, as the lowest-order layer. The referential line image 210b includes the display area 211b that is grid lines dividing the screen 200 into four vertical parts and horizontal six parts. Then, the assistant image synthesizing unit 117 synthesizes the other assistant image 215, as the higher-order layer by one order. Then, the assistant image synthesizing unit 117 synthesizes the area line image 220b that is the second assistant image, as the higher-order layer. The area line image 220b includes the display area 221b that is an area with a shape combined such that four hook-shaped figures displayed as the auto-focus area form a substantial rectangle, and the background area 223b that is an area including the inside of the substantial rectangle and the vicinity thereof. Then, the assistant image synthesizing unit 117 synthesizes the other assistant image 225, as the highest-order layer, thereby completing the synthesized assistant image 250.

In the synthesized assistant image 250, the display area 211b of the referential line image 210b and the display area 221b of the area line image 220b are displayed. For simplification, the display areas of the other assistant images 215 and 225 are not shown. The grid lines that are the display area 211b of the referential line image 210b that is the first assistant image are transparent with respect to the background area 223b set in the area line image 220b of the second assistant image. That is, in the background area 223b of the area line image 220b, the display area 211b of the referential line image 210b is not displayed. The reason is that the degree of transparency of the display area 211b of the referential line image 210b is changed with respect to the background area 223b of the area line image 220b, and the display area 211b of the referential line image 210b is completely transparent. The display area 211b of the referential line image 210b may not be completely transparent, and may be semitransparent. Similarly, the display area of the other assistant image 215 (not shown) may be also transparent or semitransparent with respect to the background area 223b set in the area line image 220b. The process of the assistant image synthesizing unit 117 changing the degree of transparency of the display area 211b of the referential line image 210b will be described later.

(2) Example of Displayed Image

Figure 5A:
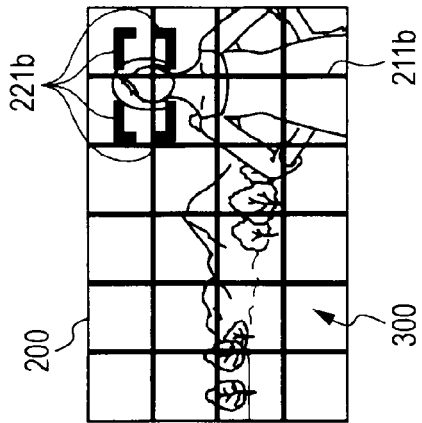
FIG. 5A to FIG. 5C are diagrams illustrating examples of displayed images according to the embodiment.
Figure 5B:
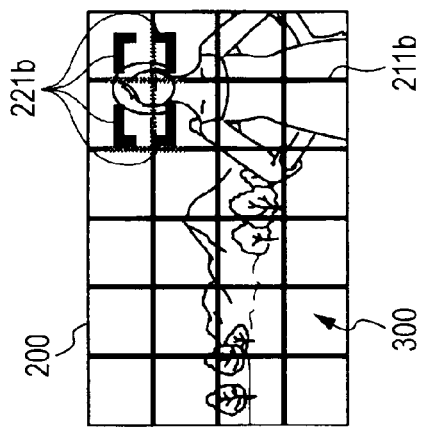
Figure 5C:
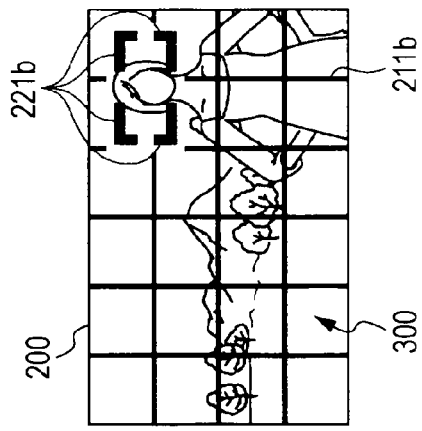
Figure 6:
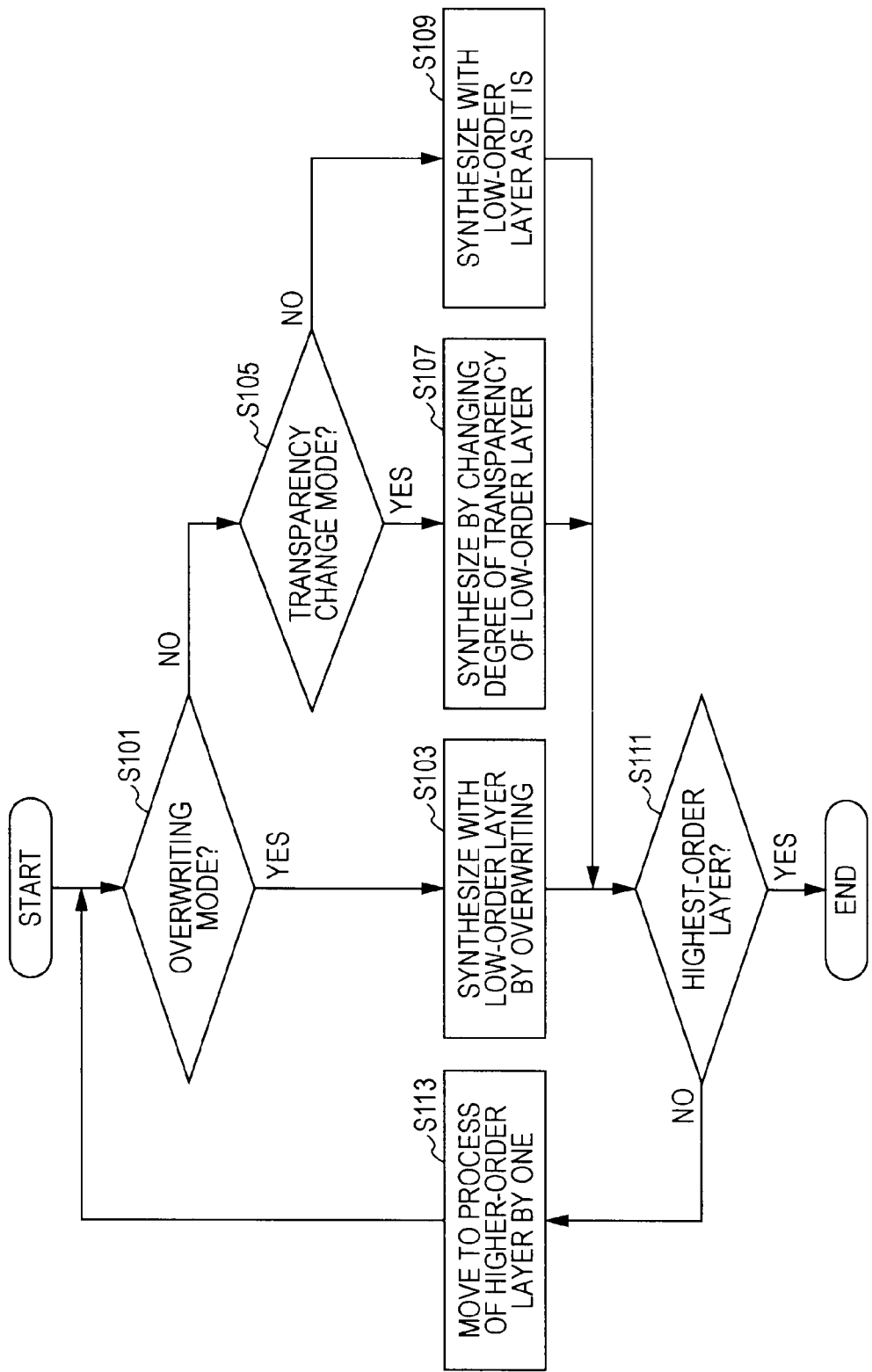
FIG. 6 is a flowchart illustrating a synthesis process of the assistant image according to the embodiment.

FIG. 5A to FIG. 5C show examples of an image which may be displayed on the display unit 121 by the display control unit 119 of the image capturing device 100 according to the embodiment. The synthesized assistant image 250 generated by the process described with reference to FIG. 4 is overlapped with the captured image 300 by the display control unit 119 and is displayed on the display unit 121. Herein, the display area 211b of the referential line image 210b and the display area 221b of the area line image 220b included in the synthesized assistant image 250 are shown. For simplification, the display areas of the other assistant images 215 and 225 are not shown.

FIG. 5A shows an example in which the grid lines that are the display area 211b of the referential line image 210b are completely transparent with respect to the background area 223b of the area line image 220b. Accordingly, in the captured image 300, the interference of the grid lines of the part displayed in the substantially rectangular area represented by the display area 221b of the area line image 220b is removed, and thus it is possible to maximize visibility of this part. The user may use the grid lines at the part other than the background area 223b of the screen 200 due to displaying the display area 211b. The part displayed in the substantially rectangular area in the captured image 300 may be, for example, the auto-focus frame that is the focusing target of the auto-focus unit 113 or the face detection frame representing the face area detected by the face detecting unit 115.

FIG. 5B shows an example in which the grid lines that are the display area 211b of the referential line image 210b are semitransparent with respect to the background area 223b of the area line image 220b. Accordingly, in the captured image 300, the interference of the grid lines of the part displayed in the substantially rectangular area represented by the display area 221b of the area line image 220b is reduced, and thus it is possible to secure visibility to some extent with respect to the grid line of this part while raising visibility of this part. The part displayed in the substantially rectangular area in the captured image 300 may be the auto-focus frame or the face detection frame in the same manner as the case shown in FIG. 5A.

FIG. 5C shows an example in which the grid lines that are the display area 211b of the referential line image 210b are displayed as they are, with respect to the background area 223b of the area line image 220b. In this case, similarly to the other part, in the captured image 300, the grid lines are displayed at the part displayed in the substantially rectangular area represented by the display area 221b of the area line image 220b, similarly to the other part. For example, in a case of wanting to display the grid lines with priority, the image capturing device 100 may change over whether or not to change the degree of transparency of the display area 211 with respect to the background area 223.

(3) Detailed Description of Process

In the embodiment, the assistant images are represented by an RGBA color model. The RGBA color model is a method in which information of colors of R (Red), G (Green), and B (Blue) and information of an alpha value A designating a degree of transparency in image data are set for each pixel to represent a color of an image. The alpha value A is in the range of 0 to 1, and may be set such that the image is completely transparent in the alpha value of 0 and the image is completely opaque in the alpha value of 1. The color representing method is not necessarily limited to the RGBA color model, and any method may be used if the degree of transparency in the image can be changed.

Hereinafter, a basic synthesis process of the assistant image when the RGBA color model is used will be described. For simplification, a case of synthesizing two layers of the high-order layer and the low-order layer is described herein, but the same is applied to a case of synthesizing three or more layers. The values of RGBA of arbitrary pixels of the low-order layer are set as shown in Formula 1.

$$R = dR$$
$$G = dG$$
$$B = dB$$
$$A = dA \quad (1)$$

The values of RGBA of the high-order layer are set as shown in Formula 2.

$$R = sR$$
$$G = sG$$
$$B = sB$$
$$A = sA \quad (2)$$

In this case, the values of RGBA of the pixels after synthesis are represented as shown in Formula 3.

$$R = sR \times sA + dR \times (1-sA)$$
$$G = sG \times sA + dG \times (1-sA)$$
$$B = sB \times sA + dB \times (1-sA)$$
$$A = sA + dA \times (1-sA)) \quad (3)$$

For example, when the alpha value sA of the high-order layer is a value close to 1, R, G, and B of the low-order layer are blocked by R, G, and B of the high-order layer, and are hardly reflected to the pixels after synthesis. Meanwhile, when the alpha value sA of the high-order layer is a value close to 0, R, G, and B of the low-order layer pass through R, G, and B of the high-order layer, and are reflected to the pixels after synthesis.

In the embodiment, synthesis mode information is added to each assistant image. The synthesis mode information may be added in advance to the image data of the assistant image stored in the storage unit 107 of the image capturing device 100, and may be added or updated by the control unit 111. The assistant image synthesizing unit 117 changes the degree of transparency of the display area 211 of the referential line image 210 that is the first assistant image on the basis of the synthesis mode information. The synthesis mode information may be, for example, numerical information shown in Table 1.

TABLE 1

| Synthesis Mode | Value |
| --- | --- |
| Normal Synthesis Mode | 0 |
| Overwriting mode | 255 |
| Transparency Change Mode | 1 to 100 |

Herein, the "normal synthesis mode" is a mode of synthesizing the assistant image corresponding to the high-order layer as it is without changing the assistant image corresponding to the low-order layer. The "overwriting mode" is a mode of synthesizing the assistant image corresponding to the low-order layer to be completely transparent in the background area of the assistant image corresponding to the high-order layer. The "transparency change mode" is a mode of changing the degree of transparency of the assistant image corresponding to the low-order layer and synthesizing the assistant image in the background area of the assistant image corresponding to the high-order layer. In the "transparency change mode", it is possible to set the value of the degree of transparency after change, and it is possible to adjust a degree of making the assistant image correspond to the low-order layer semitransparent by adjusting the value.

The synthesis mode information may not be necessarily added to all the assistant images. For example, the synthesis mode information may be added only to the area line image 220 that is the second assistant image changing the degree of transparency of the assistant image corresponding to the low-order layer. In this case, the assistant image synthesizing unit 117 may process the other assistant image to which the synthesis mode information is not added, considering the synthesis mode as the "normal synthesis mode".

FIG. 6 shows a flowchart illustrating a process of the assistant image synthesizing unit 117 of the image capturing device 100 according to the embodiment. This process is a loop process of a unit of layer of the assistant image, and this process is performed in order from the low-order layer to generate one synthesized assistant image from the plurality of assistant images.

First, the assistant image synthesizing unit 117 determines whether or not the synthesis mode of the layer to be synthesized is the "overwriting mode" (Step S101). When the synthesis mode is the "overwriting mode", the assistant image synthesizing unit 117 overwrites this layer on the low-order layer to perform the synthesis (Step S103).

Hereinafter, a process when replacing the high-order layer on the low-order layer will be described. For example, a case where the high-order layer is the area line image 220 that is the second assistant image and the low-order layer is the referential line image 210 that is the first assistant image will be described. In this case, at a part other than the part corresponding to the background area 223 of the area line image 220, the basic process described above is performed, and the values of RGBA of the pixels after synthesis are represented as shown in Formula 3. At the part corresponding to the background area 223 of the area line image 220, a synthesis process different from the basic synthesis process described above is performed, and the values of RGBA of the pixels after synthesis are represented as shown in Formula 4.

$$R = sR$$
$$G = sG$$
$$B = sB$$
$$A = sA \quad (4)$$

Accordingly, only the values of RGBA of the area line image 220 are reflected to the synthesized assistant image 250. That is, the referential line image 210 that is the first assistant image is completely transparent with respect to the background area 223 set in the area line image 220 that is the second assistant image. Accordingly, at the part where the pixels of the area line image 220 are completely transparent (sA=0) in the background area 223, the synthesized assistant image 250 is transparent, and the captured image 300 is completely transparently displayed in the image after synthesis of the synthesized assistant image 250 and the captured image 300.

Referring to FIG. 6 again, in Step S101, when it is determined that the synthesis mode of the layer to be synthesized is not the "overwriting mode", the assistant image synthesizing unit 117 thereafter determines whether or not the synthesis mode of the layer to be synthesized is the "transparency change mode" (Step S105). When the synthesis mode is the "transparency change mode", the assistant image synthesizing unit 117 changes the layer with the degree of transparency of the low-order layer and synthesizes the layers (Step S107).

Hereinafter, a process when changing the degree of transparency of the low-order layer and synthesizing the high-order layer will be described. For example, a case where the high-order layer is the area line image 220 that is the second assistant image and the low-order layer is the referential line image 210 that is the first assistant image will be described. In this case, at a part other than the part corresponding to the background area 223 of the area line image 220, the basic synthesis process described above is performed, and the values of RGBA of the pixels after synthesis are represented as shown in Formula 3. At the part corresponding to the background area 223 of the area line image 220, a synthesis process different from the basic synthesis process described above is performed, and the values of RGBA of the pixels after synthesis are represented as shown in Formula 5. A value of vA is a value in the range of 0.01 to 1, which is obtained by dividing a numerical value of 1 to 100 by 100 set in the case of "transparency change mode" in the synthesis mode information shown in Table 1.

$$R = sR \times sA + dR \times (1-sA)$$

$$G = sG \times sA + dG \times (1-sA)$$

$$B = sB \times sA + dB \times (1-sA)$$

$$A = sA + dA \times vA \times (1-sA) \quad (5)$$

Accordingly, the values of RGBA of the area line image 220 and the values of RGBA of the referential line image 210 with the degree of transparency changed according to the value of vA are reflected to the synthesized assistant image 250. In Formula 5, dA of Formula 3 is overwritten by dA×VA. That is, the degree of transparency of the referential line image 210 that is the first assistance image is changed and the referential line image 210 is semitransparent with respect to the background area 223 set in the area line image 220 that is the second assistant image. The degree of semi-transparency is changed by the value set for the synthesis mode information, and the referential line image 210 gets more transparent as the value gets smaller. Accordingly, the referential line image 210 is displayed on the synthesized assistant image 250 at the part where the pixels of the area line image 220 are completely transparent (sA=0) with respect to the background area 223, but the alpha value dA is smaller than the original alpha value dA of the referential line image 210 (therefore, vA is in the range of 0.01 to 1), the display area 211 of the referential line image 210 is semi-transparently displayed. For this reason, the captured image 300 is transparently displayed to some extent on the image after synthesis of the synthesized assistant image 250 and the captured image 300.

Referring to FIG. 6 again, in Step S105, when it is determined that the synthesis mode of the layer to be synthesized is not the "transparency change mode", the assistant image synthesizing unit 117 determines that the synthesis mode of the layer to be synthesized is the "normal synthesis mode". Then, the assistant image synthesizing unit 117 synthesizes the layer with the low-order layer as it is (Step S109). In this case, in the area including the part corresponding to the background area 223 of the area line image 220, the basic synthesis process described above is performed, and the values of RGBA of the pixels after synthesis are represented as shown in Formula 3.

After the synthesis process in Step S103, Step S107, or Step S109, the assistant image synthesizing unit 117 determines whether or not the layer to be synthesized is the highest-order layer (Step S111). When the layer to be synthesized is the highest-order layer, the assistant image synthesizing unit 117 ends the process. In Step S111, when the layer to be synthesized is not the highest-order layer, the assistant image synthesizing unit 117 transfers to the process of the higher-order by one order (Step S113), and returns to Step S101.

2. Second Embodiment

Next, a second embodiment of the present disclosure will be described with reference to FIG. 7. The second embodiment of the present disclosure is different from the first embodiment in that the image capturing device has a display mode setting function, but the functional configuration is otherwise substantially the same as that of the first embodiment, and the detailed description is not repeated.

In the embodiment, the control unit 111 changes the synthesis mode information set in the area line image 220 that is the second assistant image according to a user's operation acquired by the operation unit 109, to thereby set the degree of transparency of the referential line image 210 that is the first assistant image after the change performed by the assistant image synthesizing unit 117. Specifically, the control unit 111 changes the synthesis mode set in the area line image 220 to any of the "normal synthesis mode", the "overwriting mode", and the "transparency change mode". The control unit 111 may change the value representing the degree of transparency of the referential line image 210 after change such that the synthesis mode is the "transparency change mode". The assistant image with the synthesis mode information changed by the control unit 111 is not limited to the area line image 220, and may be the other assistant image.

Figure 7:
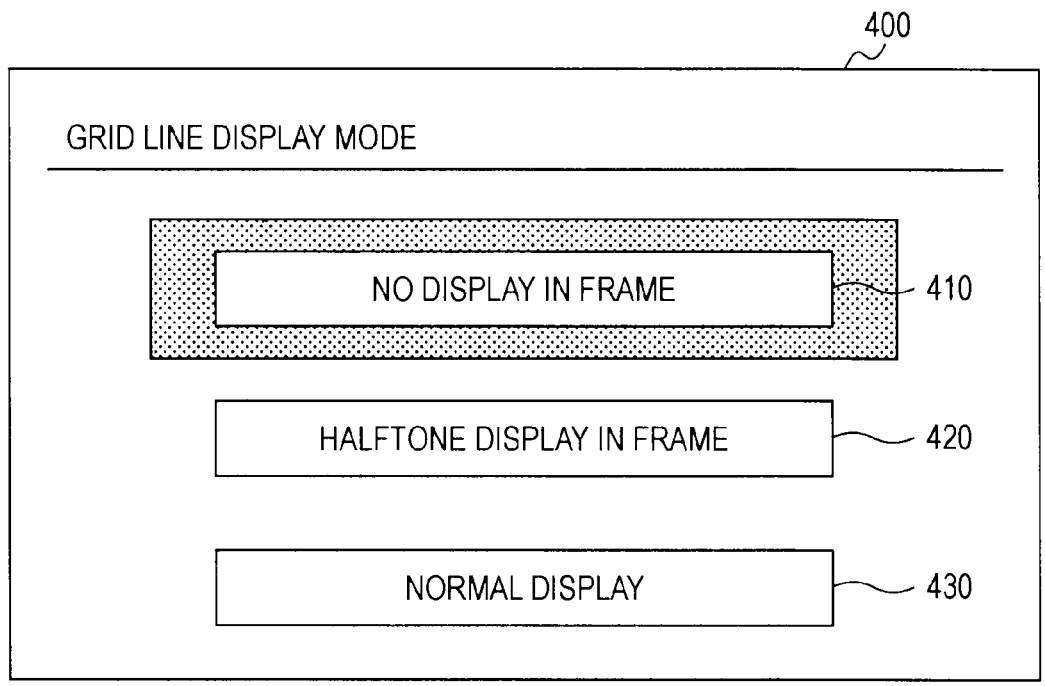
FIG. 7 is a diagram illustrating a mode setting screen according to a second embodiment of the present disclosure.

FIG. 7 shows a display mode setting screen 400 displayed by the display control unit 119 in the image capturing device 100 according to the second embodiment of the present disclosure. The display mode setting screen 400 is displayed on the display unit 121, for example, by pressing the menu button included in the operation unit 109 of the image capturing device 100. In the shown example, the display mode setting screen 400 includes a overwriting mode button 410, a transparency change mode button 420, and a normal synthesis mode button 430. The control unit 111 acquires the user's operation for setting the degree of transparency after change of the referential line image 210, for example, using the cross button, the touch panel, or the like included in the operation unit 109 by operation of such a button. Accordingly, for example, when the user presses the overwriting mode button 410, the control unit 111 sets the synthesis mode of the synthesis mode information added to the area line image 220 stored in the storage unit 107 to the "overwriting mode".

The display mode setting screen 400 may not be necessarily the shown screen. For example, the display mode setting screen 400 may include only the overwriting mode button 410 and the normal synthesis mode button 430. The display mode setting screen 400 may include an adjusting operator such as a slide bar directly setting the degree of transparency after change of the referential line image 210.

As a modified example of the second embodiment of the present disclosure, the control unit 111 may automatically change the synthesis mode information set in the area line image 220 that is the second assistant image according to the state of the image capturing process, to thereby set the degree of transparency of the referential line image 210 that is the first assistant image after the change performed by the assistant image synthesizing unit 117. For example, the control unit 111 may change the degree of transparency of the referential line image 210 with respect to the background area 223 of the area line image 220 that is the image in the auto-focus frame considering the focusing of the auto-focus unit 113 as a trigger, to make the referential line image 210 completely transparent or semitransparent. The control unit 111 may change the degree of transparency of the referential line image 210 with respect to the background area 223 of the area line image 220 that is the image in the face detection frame considering the detection of the low-order area performed by the face detecting unit 115 as a trigger, to make the referential line image 210 completely transparent or semitransparent.

3. Third Embodiment

Next, a third embodiment of the present disclosure will be described with reference to FIG. 8 to FIG. 11. The third embodiment of the present disclosure is different in the configuration of the area line image 220 that is the second assistant image from the first embodiment, but the functional configuration is otherwise substantially the same as that of the first embodiment, and the detailed description is not repeated. In the following description, the area line image 220 is shown to be overlapped with the captured image 300 to easily understand the display state.

Figure 8:
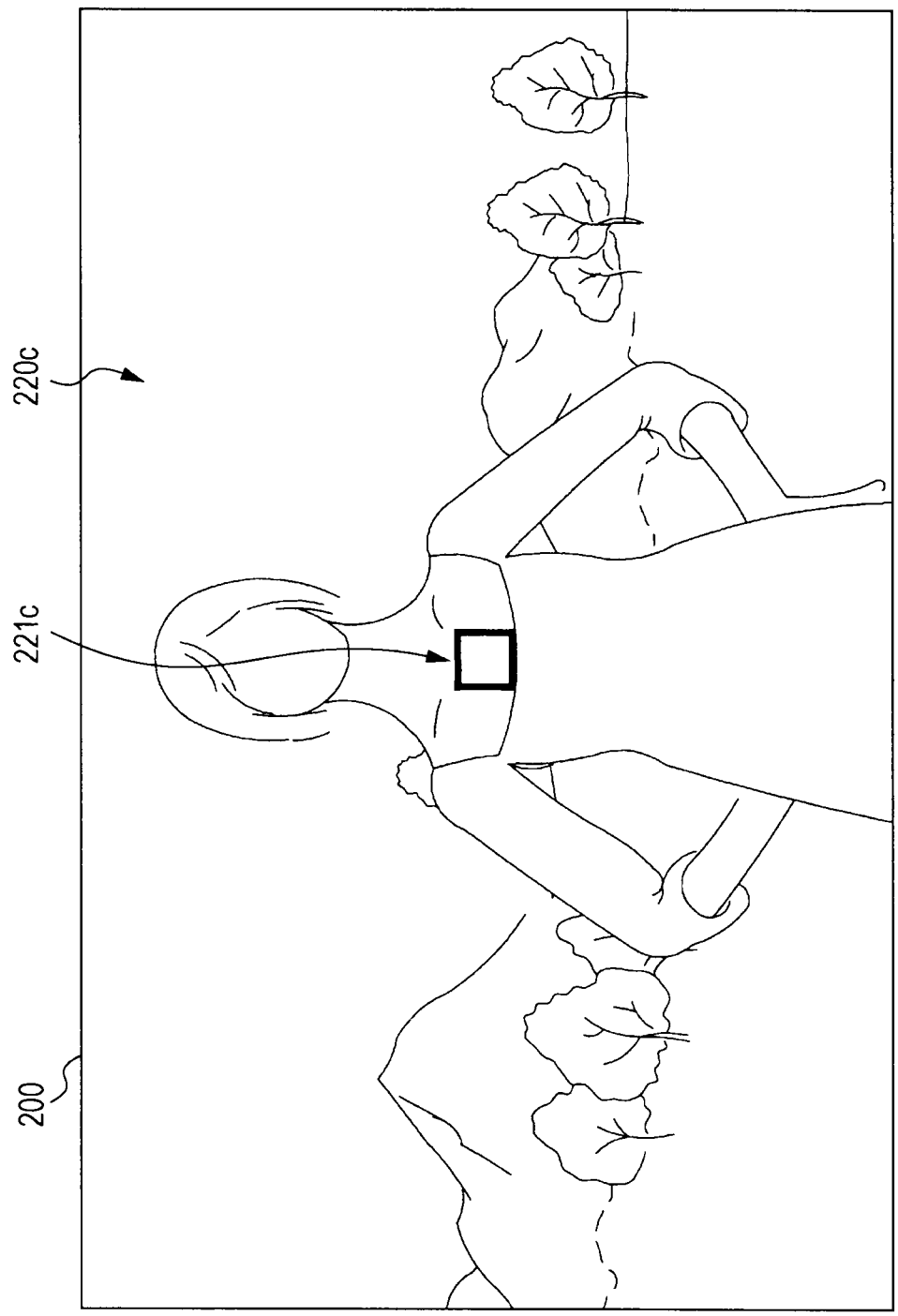
FIG. 8 is a diagram illustrating an example of an area line image according to a third embodiment of the present disclosure.

FIG. 8 shows an area line image 220c as a first example of the area line image 220 according to the embodiment. A display area 221c in the area line image 220c is one auto-focus frame set on the screen 200. For example, the display area 221c may represent an area that is an auto-focus target of the auto-focus unit 113 of the image capturing device 100 by the user's setting or an area focused by the process of the auto-focus unit 113.

Figure 9:
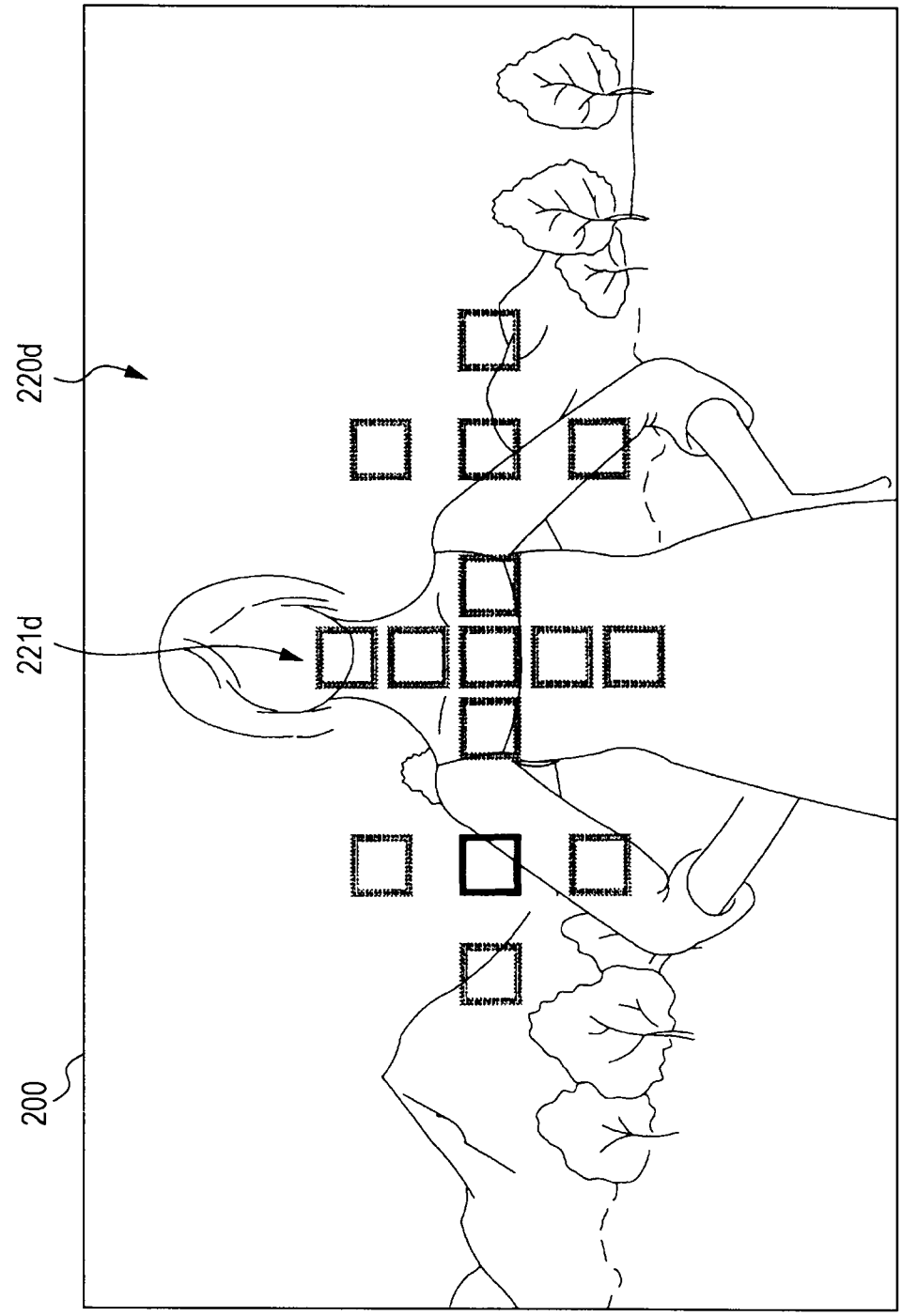
FIG. 9 is a diagram illustrating an example of an area line image according to the embodiment.

FIG. 9 shows an area line area 220d as a second example of the area line image 220 according to the embodiment. Display areas 221d in the area line image 220d are a plurality of auto-focus frames set on the screen 200. The plurality of auto-focus frames included in the display areas 221d may have degrees of transparency different from each other. In the shown example, the display areas 221d are fifteen auto-focus areas, and include one substantially opaque auto-focus frame, and semitransparent fourteen auto-focus frames. The semitransparent auto-focus frames among them may represent, for example, areas which may be auto-focus targets of the auto-focus unit 113 of the image capturing device 100. The substantially opaque auto-focus frame may represent, for example, an area that is the auto-focus target of the auto-focus unit 113 by user's selection among fifteen auto-focus frames, or an area focused by the process of the auto-focus unit 113 among fifteen auto-focus frames.

Figure 10:
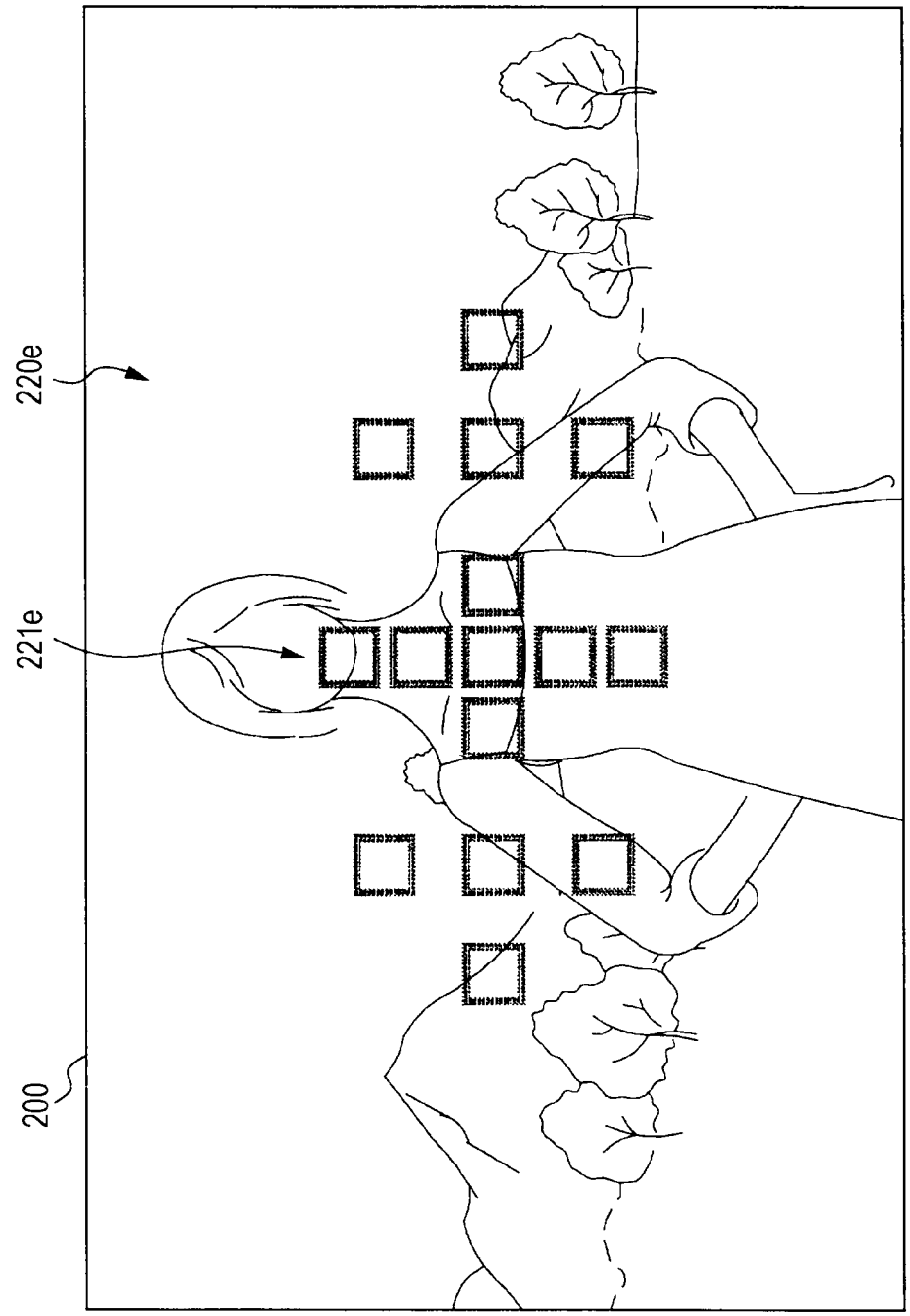
FIG. 10 is a diagram illustrating an example of an area line image according to the embodiment.

FIG. 10 shows an area line image 220e as a third example of the area line image 220 according to the embodiment. Display areas 221e in the area line image 220e are a plurality of auto-focus frames set on the screen 200. All the plurality of auto-focus frames included in the display areas 221e are semi-transparently displayed. In the shown example, the display areas 221e are fifteen semi-transparently displayed auto-focus frames. Such auto-focus frames may represent, for example, areas which may be the auto-focus target of the auto-focus unit 113 of the image capturing device 100.

FIG. 11 shows an area line image 220f as a fourth example of the area line image 220 according to the embodiment. Display areas 221f in the area line image 220f are a plurality of auto-focus frames set on the screen 200. All the plurality of auto-focus frames included in the display areas 221f are substantially opaque. In the shown example, the display areas 221f are five auto-focus frames. The number of auto-focus frames is not limited to five. Such auto-focus frames may represent, for example, areas focused by the process of the auto-focus unit 113 of the image capturing device 100.

An operation example of the image capturing device 100 using four kinds of area line images 220c to 222f described above will be described. In the operation example, the image capturing device 100 automatically extracts a focusable auto-focus frame from the plurality of auto-focus frames. First, the assistant image synthesizing unit 117 generates the synthesized assistant image 250 including the area line image 220e shown in FIG. 10. The synthesized assistant image 250 is overlapped with the captured image 300, and the user thereby recognizes an area which may be the auto-focus target of the auto-focus unit 113. In this state, when the user operates, for example, the shutter button included in the operation unit 109 to transmit an operation signal representing an instruction of focusing to the control unit 111, the control unit 111 operates the auto-focus unit 113 to perform focusing. As a result, when there are a plurality of focused areas, the control unit 111 generates the area line image 220f shown in FIG. 11 to provide it to the assistant image synthesizing unit 117. When there is one focused area, the control unit 111 generates the area line image 220c shown in FIG. 8 to provide it to the assistant image synthesizing unit 117. The assistant image synthesizing unit 117 generates the synthesized assistant image 250 including the area line image 220f or the area line image 220c. The synthesized assistant image 250 is overlapped with the captured image 300, and thus the user recognizes the area focused by the auto-focus unit 113.

Another operation example of the image capturing device 100 using the four kinds of area line images 220c to 220f will be described. In this operation example, the image capturing device 100 selects the auto-focus frame focused on the basis of the user's operation from the plurality of auto-focus frames. First, the assistant image synthesizing unit 117 generates the synthesized assistant image 250 including the area line image 220d shown in FIG. 9. The auto-focus frame represented by the color substantially opaque with respect to the area line image 220d represents the currently selected auto-focus frame. In this state, the user operates, for example, the cross key included in the operation unit 109 to move the selected auto-focus frame. The control unit 111 updates the position of the auto-focus frame represented by the color substantially opaque with respect to the area line image 220d according to the user's operation, to provide the updated area line image 220d to the assistant image synthesizing unit 117. When the user operates, for example, the shutter button included in the operation unit 109 to transmit the operation signal representing the instruction of focusing to the control unit 111, the control unit 111 operates the auto-focus unit 113 to perform focusing. In this case, the control unit 111 generates the area line image 220c shown in FIG. 8 to provide it to the assistant image synthesizing unit 117. The assistant image synthesizing unit 117 generates the synthesized assistant image 250 including the area line image 220c. The synthesized assistant image 250 is overlapped with the captured image 300, and the user thereby recognizes the focusing in the area represented by the selected auto-focus frame.

In the third embodiment of the present disclosure described above, the degree of transparency of the referential line image such as the grid lines is changed with respect to the background area 223 of the area line image 220, and the user thereby easily recognizes the image included in the auto-focus frame in the operation of the image capturing device 100 using, for example, the area line images 220c to 220f.

4. Overview

The image capturing device according to the embodiment of the present disclosure includes an assistant image synthesizing unit that changes a degree of transparency of a display area of a first assistant image in a transparent background area set in a second assistance image, when generating a synthesized assistant image by synthesizing the first and second assistant images providing assistance information for capturing, and a display control unit that overlaps the synthesized assistant image with a captured image and displays the image on a display unit. With such a configuration, since the degree of transparency of the first assistant image in the background area of the second assistant image is changed when the first assistant image and the second assistant image are overlapped and displayed, it is possible to suppress the interference of the first assistant image with the second assistant image.

The assistant image synthesizing unit may change the degree of transparency at least on the basis of synthesis mode information added to the second assistant image. With such a configuration, when the plurality of compositions corresponding to the first assistant image and the second assistant image are set in the plurality of assistant images, it is possible to set the method of changing the degree of transparency by combining them.

The assistant image synthesizing unit may make the first assistant image completely transparent in the background area. With such a configuration, in the synthesized assistant image, only the second assistant image is displayed in the background area of the second assistant image, and the use can clearly recognize the contents represented by the second assistant image.

The background area may be an area including a display area of the second assistant image. With such a configuration, a certain degree of margin is secured in the vicinity of the display area of the second assistant image, the display area of the first assistant image and the display area of the second assistant image are non continuous, and thus the user can easily distinguish and recognize the first assistant image and the second assistant image.

The first assistant image may be a referential line image of the captured image, and the second assistant image may be an area line image of the captured image. With such a configuration, when the area line image displayed at a specific part of the screen is overlapped with the referential line image displayed on the whole screen, it is possible to suppress the interference of the referential line image with the area represented by the area line image.

The referential line image may be a grid line image, and the area line image may be an auto-focus frame image. With such a configuration, the grid line in the auto-focus frame is transparently or semi-transparently displayed, and it is easy to recognize the photography subject included in the auto-focus frame.

The auto-focus frame image may include a plurality of auto-focus frames. With such a configuration, the plurality of auto-focus frames set in the captured image are easily distinguished and recognized from the area line image, and it is possible to easily recognize the photography subject included in the auto-focus frame.

The referential line image may be a grid line image, and the area line image may be a face detection range image. With such a configuration, the grid line in the face detection frame is transparently or semi-transparently displayed, and it is possible to easily recognize the face included in the face detection frame.

The image capturing device may further include a control unit that sets the changed degree of transparency according to a user's operation acquired by an operation unit. With such a configuration, it is possible to arbitrarily set how much to change the degree of transparency of the first assistant image in the background area of the second assistant image, according to photography subjects of capturing or user's preference.

The image capturing device may further include a control unit that automatically sets the changed degree of transparency according to a state of an image capturing process. With such a configuration, it is possible to set the degree of transparency to be more suitable for the user according to the change of the state of the image capturing process, such as the focusing of the auto-focus or the detection of the face area.

The present disclosure contains subject matter related to that disclosed in Japanese Priority Patent Application JP 2010-186294 filed in the Japan Patent Office on Aug. 23, 2010, the entire contents of which are hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. An image capturing device comprising:
   circuitry configured to change a degree of transparency of a first assistant image in an area of the first assistant image that includes a transparent background area of a second assistant image when generating a synthesized assistant image,
   wherein the area of the first assistant image that includes the transparent background area of the second assistant image is larger than the transparent background of the second assistant image and the synthesized assistant image is displayed with a captured image.

2. The image capturing device according to claim 1, wherein the degree of transparency is changed in accordance synthesis information that indicates at least one of a transparency synthesis mode and an overwrite synthesis mode.

3. The image capturing device according to claim 1, wherein the circuitry makes the first assistant image completely transparent in the background area.

4. The image capturing device according to claim 1,
   wherein the first assistant image is a referential line image, and
   wherein the second assistant image is an area line image.

5. The image capturing device according to claim 4,
   wherein the referential line image is a grid line image, and
   wherein the area line image is an auto-focus frame image.

6. The image capturing device according to claim 5, wherein the auto-focus frame image includes a plurality of auto-focus frames.

7. The image capturing device according to claim 4,
   wherein the referential line image is a grid line image, and
   wherein the area line image is a face detection frame image.

8. The image capturing device according to claim 1, wherein the circuitry is further configured to change the degree of transparency according to an acquired user operation.

9. The image capturing device according to claim 1, wherein the circuitry is further configured to automatically change the degree of transparency according to a state of an image capturing process.

10. The image capturing device according to claim 1, wherein each of the first and second assistant images are provided on a separate layer and an order of layer overlapping is determined based on a display priority of the first and second images.

11. The image capturing device according to claim 10, wherein a portion of one of the first and second assistant images is not displayed in a region of overlap between the first and second assistant images when the one of the first and second assistant images has a lower display priority than another of the first and second assistant images.

12. The image capturing device according to claim 1, wherein the synthesized assistant image is displayed with a captured image in a predetermined area of the captured image based on an image capturing position.

13. A non-transitory computer-readable medium storing computer-readable instructions thereon, the computer-readable instructions when executed by a computer cause the computer to perform a method comprising:
changing a degree of transparency of a first assistant image in an area of the first assistant image that includes a transparent background area of a second assistant image when generating a synthesized assistant image, the area of the first assistant image that includes the transparent background area of the second assistant image being larger than the transparent background of the second assistant image; and
displaying the synthesized assistant image with a captured image.

14. An image capturing method comprising:
changing, with circuitry, a degree of transparency of a first assistant image in an area of the first assistant image that includes a transparent background area of a second assistance image based on a synthesis information when generating a synthesized assistant image, the area of the first assistant image that includes the transparent background area of the second assistant image being larger than the transparent background of the second assistant image; and
displaying, with the circuitry, the synthesized image with a captured image.

* * * * *